United States Patent [19]

Matthey et al.

[11] E Re. 28,567

[45] Reissued Oct. 7, 1975

[54] PHASE AND SPEED CONTROL OF A DC MOTOR

[75] Inventors: Henri Matthey, La Chaux-de-Fonds; Jean Jacques Bessire, Bienne, both of Switzerland

[73] Assignee: Eresa S.A., Bienne, Switzerland

[22] Filed: May 29, 1973

[21] Appl. No.: 364,620

Related U.S. Patent Documents

Reissue of:

[64] Patent No.: 3,689,816
Issued: Sept. 5, 1972
Appl. No.: 67,191
Filed: Aug. 26, 1970

U.S. Applications:

[63] Continuation of Ser. No. 671,460, Sept. 28, 1967, abandoned.

[30] Foreign Application Priority Data

Sept. 29, 1966 Switzerland ..... 14087/66

[52] U.S. Cl. .....318/314; 318/318

[51] Int. Cl. .....H02p 5/16

[58] Field of Search ..... 318/314, 318

[56] References Cited

UNITED STATES PATENTS

| | | | |
|---|---|---|---|
| 3,207,970 | 9/1965 | Branco | 318/318 |
| 3,215,918 | 11/1965 | Lichowsky | 318/314 |
| 3,361,949 | 1/1968 | Brown | 318/314 |

*Primary Examiner*—Bernard A. Gilheany
*Assistant Examiner*—Thomas Langer
*Attorney, Agent, or Firm*—Fitzpatrick, Cella, Harper & Scinto

[57] ABSTRACT

A control device for controlling the speed of an electric motor characterized by means for forming a reference signal having a frequency corresponding to the desired speed and to the desired angular position of the motor, means for forming a signal the frequency of which corresponds to the actual speed and angular position of the motor, and means for comparing the signals and controlling the motor according thereto.

3 Claims, 5 Drawing Figures

M.
6.
5.
4
3
7
1.
2
13.
15.
14
16
17
30
29
35
34
32
S
R
C5
m
f
P1
P2

C
M.
6
5
t
tr
8
9
P1
P2
12
11
10
m3
m2
m1
37
38
D1
D2
mx
my
7
2.
1
m
f

+
-
t(tr)
f(m)

PHASE AND SPEED CONTROL OF A DC MOTOR

Matter enclosed in heavy brackets [ ] appears in the original patent but forms no part of this reissue specification; matter printed in italics indicates the additions made by reissue.

---

This application is a continuation of copending application Ser. No. 671,40 filed Sept. 28, 1967 and now abandoned.

The present invention concerns a control device for controlling the speed of an electric motor, and more particularly a motor intended for driving either cameras or magnetophones. In this particular field it is important, for example, when one desires to sonorize a film or simply in order to avoid modulations during the reading of a sound record or to insure a uniform passing of a film to be projected, that the speed of rotation of the motors driving the cameras, or respectively the magnetophones, be constant and identical.

To realize this working precision it is necessary that the speed of the driving motor be controlled and therefore different devices for their control have heretofore been proposed. In the category of controls where the regulation of the motor is made by acting on the amplitude of its feeding voltage, one may distinguish between control devices working by phase comparison or by frequency comparison. Some controls provide means precision in a great range, whereas others provide very good precision but are limited to a very small regulating range.

The present invention has for its object a method of controlling the speed of rotation of an electrical motor by forming a reference signal having a frequency corresponding to the desired speed and to the desired angular position of the motor as well as a working AC generator signal, the frequency of which corresponds to the actual speed and to the actual angular position of the motor, said method being characterized by forming a velocity signal from said generator signal, forming two position signals from said reference and generator signals, said position signals being equal for a perfect working of the motor and unequal as soon as the angular position of the motor is different from its reference angular position, then simultaneously comparing the velocity signal with a reference velocity signal and the position signals to obtain a control signal for the motor.

Another object of the present invention is to provide a control device for an electrical motor which has very high precision over a large regulating range. This control device comprises circuit means for delivering a DC reference velocity signal; reference frequency means for delivering an AC reference frequency signal; and generator means driven by a motor for delivering an AC generator signal corresponding to the actual speed and phase of the motor. In addition, the control device includes a circuit fed by the AC reference frequency signal and by the AC generator signal which delivers a first DC position and a second DC position signal. The difference between the position signals is equal to zero when the phase of the AC generator signal is lagging or leading the phase of the AC reference frequency signal by 90°. Circuit means are provided which are fed by the AC generator signal for delivering a DC velocity signal corresponding to the actual speed of the motor. Differential amplifier means are fed on the one hand by the sum of the DC reference velocity signal and the first position signal, and on the other hand by the sum of the actual DC velocity signal and the second position signal. The differential amplifier means delivers a DC control voltage, the amplitude of which controls the energy supplied to the motor. Power amplifier means are provided for the DC control voltage, and a stabilizing circuit is connected in parallel with a capacitor fed by the intermediary of a rectifier by the generator means.

Figures 1, 4:
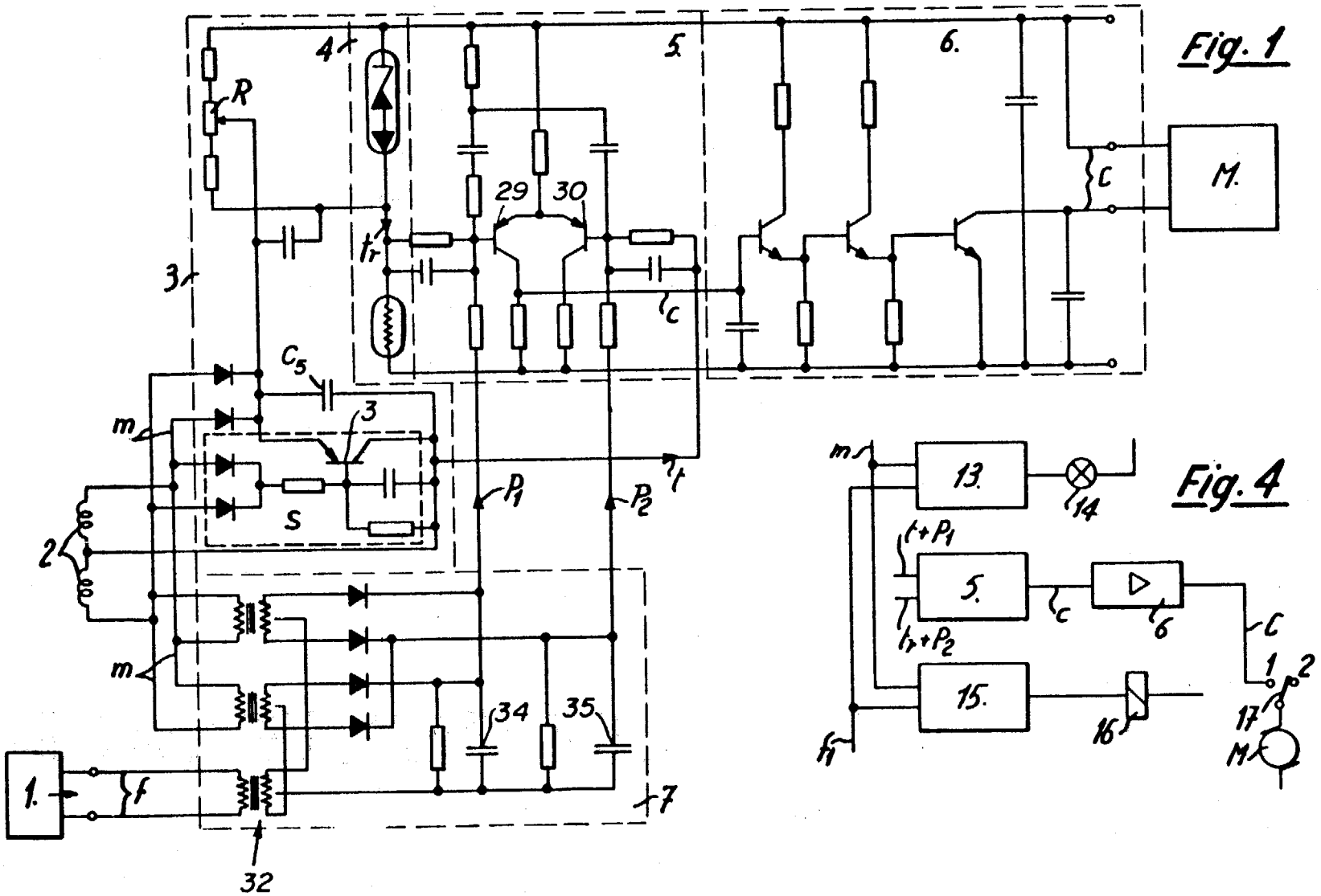
FIG. 1 is a combination block and schematic diagram of the first embodiment of the control device.
FIG. 4 shows a variation of the device comprising safety and alarm devices.

In the first embodiment, shown in FIG. 1, the control device comprises a reference frequency source 1 and an alternator or generator 2 driven in rotation by the motor M thereby furnishing a working or generator signal m having a frequency which corresponds to the speed of the motor M. The generator 2 is mounted at the end of the shaft of the motor M, and hence the frequency of this generator is directly responsive to the angular speed of the motor.

Out of the working signal m is formed, by means of the circuit 3, a velocity signal t having an amplitude which varies as a function of the frequency of the working signal m, but the absolute value of which may be adjusted by means of a potentiometer R. It is evident that the circuit shown in FIG. 1, as an example, could be varied by replacing any of the devices by other devices having the same functions.

In order to avoid having unwanted oscillations due to the time constant introduced by the capacitor $C_5$, a stabilizing electronic discharge circuit S including a transistor 3 is connected in parallel with this capacitor $C_5$. This electronic discharge circuit S of the capacitor $C_5$ is fed by the intermediary of a separate rectifier by the generator 2. This capacitor $C_5$ avoids finding an alternative component of a frequency equal to twice the one of the generator in the signal t, which would render any control of the motor M impossible. That is, the capacitor $C_5$ is used to filter the rectified voltage delivered by the generator 2. If it is assumed that the circuit S does not exist, the filtering function of the capacitor $C_5$ is easy to understand. The aim of the circuit S is to discharge the capacitor $C_5$ when the peak amplitude of the rectified signal drops.

Further, this control device comprises a device 4 for delivering a velocity reference signal tr. In the example shown, this signal tr is obtained by means of a Zener diode. However, another source of reference voltage could be used, if desired. That is, the signal t is effectively taken off the center tap of the winding of the generator 2 which is at "relative ground." By "relative ground" it is meant that this potential is cold, i.e., without any AC component. However, this "relative ground" potential t has a DC component which increases linearly as a function of the speed of the motor, and hence, it is a DC signal corresponding to the actual speed of the motor. The voltage tr is a reference voltage which is determined by the Zener diode. A certain amount of this potential is taken off the potentiometer R, and is added to the voltage t.

Thus, when the motor starts, its speed must be equal to zero:

t = fixed potential taken off the potentiometer R tr = fixed reference voltage and the differential amplifier is out of equilibrium and delivers a maximum current to the motor.

When the motor reaches its synchronous speed (or is about at its synchronous speed):

t = tr and the differential amplifier is in equilibrium and the current of the motor is reduced.

If t is greater than tr, the current will be cut off.

These two velocity signals t and tr are delivered to a comparator device or differential amplifier which furnishes a control signal c when the two signals t and tr are unequal. In the example shown, this comparator device is constituted by a differential amplifier and the signals t and tr control, respectively, the biasing of the bases of transistors of this differential amplifier. That is, the differential amplifier 5 comprises a transistor 29 which receives a reference voltage from the device 4 and a transistor 30 which receives a control voltage from the generator 2, depending upon the speed of the motor. These voltages are DC voltages and the voltage received by the transistor 30 is rectified and filtered electronically by the circuit 3. To this voltage a DC voltage is added which is adjustable through the potentiometer R and which defines the equilibrium state of the differential system.

By means of the potentiometer R one adjusts the level of the signal t so that it is equal to the level of the signal tr when the motor revolves at its desired speed. Thanks to this possible adjustment of the level of the signal t, it is possible to modify the reference speed of the motor in relatively wide limits.

The signal c is amplified in power amplifier means 6 to form a control signal C which may constitute the feeding of the motor M.

The velocity control loop described works in the following manner:

During the starting of the motor, the difference between the levels of the velocity signals t and tr is great so that the control signal C causes a rapid starting of the motor. Then, when the motor reaches its reference speed, its feeding voltage diminishes up to the reaching of a nought value when the motor revolves at its reference speed. It is to be noted, however, that an equilibrium will be attained if the torque wanted from the motor is not too high and that finally the motor revolves at a speed near but lower than a reference speed.

This velocity control enables the speed of the motor to be brought into the neighborhood of its reference speed, but it does not permit it to be maintained within the precision needed for the particular applications referred to hereinbefore. In addition, the control device described comprises a phase control loop or angular motor position control loop. It will be appreciated that the effect of the foregoing speed regulation is always superimposed on the effect of the phase comparator.

The phase control loop is based on a comparison of the phase of the generator 2 with the reference frequency. This phase control loop comprises a device 7 forming two position signals $P_1$, $P_2$ out of the generator signal m and out of the reference signal f delivered by the reference source 1. That is, the phase control or comparator loop delivers between $P_1$ and $P_2$ a DC voltage which is proportional to the phase shift between frequencies coming from the frequency source 1 and from the generator 2. The winding of a transformer or rectifier, indicated generally at 32, FIG. 1, are connected in such a way that when the frequency coming from the frequency source 1 and the generator 2 are in [phase] *quadrature* their voltage cancels and consequently produces a voltage equal to zero between $P_1$ and $P_2$. This latter increases as soon as the phase shift occurs. That is, these position signals $P_1$, $P_2$ are such that their difference is large when the frequency of the working signal m and of the reference signal f are in phase, and it is zero when the signals are 90° out of phase. However, this difference between the signals $P_1$ and $P_2$ becomes maximum for a difference of phase equal to zero or to half a period between the signals m and f. As seen in FIG. 1, if the voltage obtained by rectifying the voltages delivered by generator 2 and frequency standard 1 are in quadrature, i.e., present a phase shift of 90°, two capacitors 34 and 35, which are connected to the rectifier 32, are charged to an equal voltage and thus do not bring the differential amplifier out of equilibrium. If the phase of the rectified voltage delivered by frequency standard 1 and the generator 2 are shifted to a value other than 90°, the voltages of one of the capacitors will rise whereas the voltage of the other will fall. These position signals $P_1$ and $P_2$ are respectively superimposed on the signals tr and t for the control of the comparator device 5.

These position signals $P_1$ and $P_2$ are practically without effect on the working of the motor when it functions far away from its reference conditions. In fact, under these conditions the velocity signals tr and t are preponderant for the control of the motor. When the motor is in the immediate neighborhood of its reference conditions, i.e., less than half a period from the reference frequency, and its angular position is in the immediate vicinity of the desired angular position, the position signals $P_1$, $P_2$ become preponderant for the control of the motor. In fact, thanks to these signals $P_1$, $P_2$ the motor is maintained with a very high precision not only as to its reference speed but also with respect to its angular position which is well defined, at the most lacking only a few degrees of its desired angular position. This control range of the angular position of the motor is determined by the reference frequency.

Thanks to the control device, the motor M can be brought up by velocity control until near its reference speed, and then its speed and its angular position are maintained with great precision thanks to the phase of position control.

This first embodiment gives entire satisfaction for the control of a fixed speed motor. However, frequently in the field of sonorization of films it is desirable to control the speed of a motor, not on a fixed reference value but on a reference value which varies with time. The second embodiment described hereinafter solves this problem. Principally this second embodiment differentiates itself from the one already described in the manner in which the velocity reference signal tr is obtained. This signal, tr, has to vary as a function of the reference signal f delivered by the reference source 1 which is not fixed but varies in time according to a given law.

Figure 2:
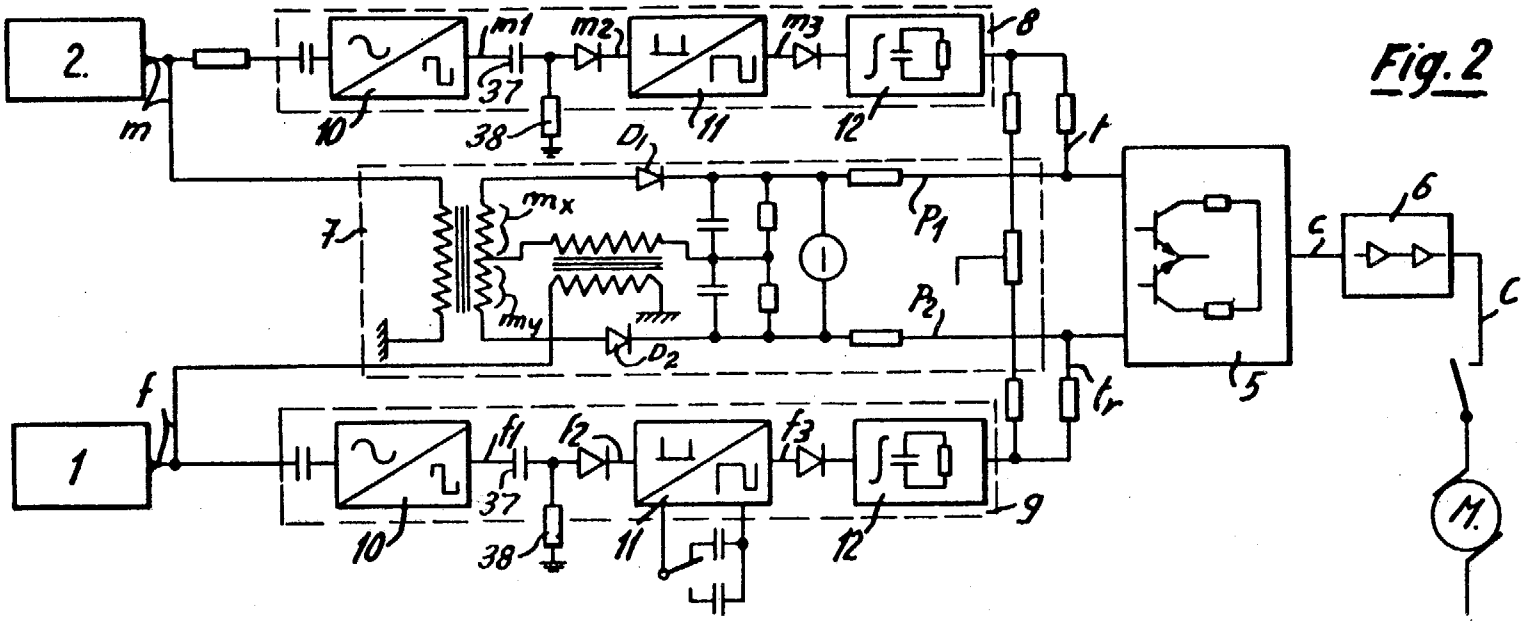
FIG. 2 is a combination block and schematic diagram of the second embodiment of the device.

As shown in FIG. 2, this second embodiment is identical to the first one except for the formation of the velocity signals t and tr. In fact, these two signals are obtained by means of identical integrator circuits 8, 9 respectively.

Each of these forming circuits 8, 9 of the signals t and tr, respectively, comprises a Schmitt Trigger 10 fed by the working signal m of the motor M on the one hand and by the reference signal f on the other hand.

This results in two squared voltages $m_1$ and $f_1$, as seen in FIG. 2. Differentiation by condensors 37 and grounded resistors 38 transforms the signals $m_1$ and $f_1$ to $m_2$ and $f_2$, respectively. The signals $m_2$ and $f_2$ each feed a monostable multivibrator 11 which delivers a squared output voltage $m_3$ and $f_3$. The duration of the squared voltage is constant as determined by the constant of the monostable multivibrator. The duration of the period depends upon the speed of the motor. The interval of the zero voltage increases as the speed of the motor decreases. The signals $m_3$ and $f_3$ are integrated in the circuit 12 and give as their output voltages t and tr which are the control voltages of the differential amplifier.

In addition, the circuit of FIG. 2 includes a phase discriminator 7. For a better understanding of the working of this second part of the circuit of FIG. 2, a diagrammatic representation will facilitate the understanding thereof, as follows:

When there is an exact phase quadrature, the diagrammatic representation is as follows:

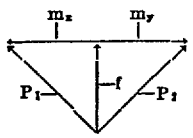

The vectors $m_x$ and $m_y$ are perpendicular to the vector f. The diodes $D_1$ and $D_2$ detect the resulting voltage of the vector sums.

$$P_1 = f + m_x \text{ for the diode } D_1$$

$$P_2 = f + m_y \text{ for the diode } D_2$$

In this case the voltages $P_1$ and $P_2$ are equal. If the phase is displaced or shifted in one direction or the other, the diagrammatic representation appears as follows:

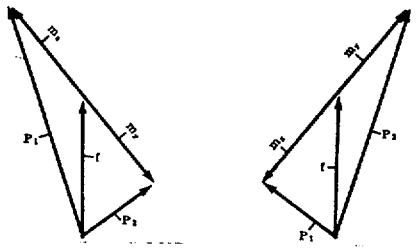

In both of these diagrams we have resulting voltages which are not equal, and in one case $P_1$ is greater than $P_2$ and in the other case $P_1$ is smaller than $P_2$. The unequal voltages $P_1$ and $P_2$ are applied to the differential amplifier which acts thereafter on the direct current amplifier of the motor by increasing or diminishing the feeding current of the motor.

Figure 3:
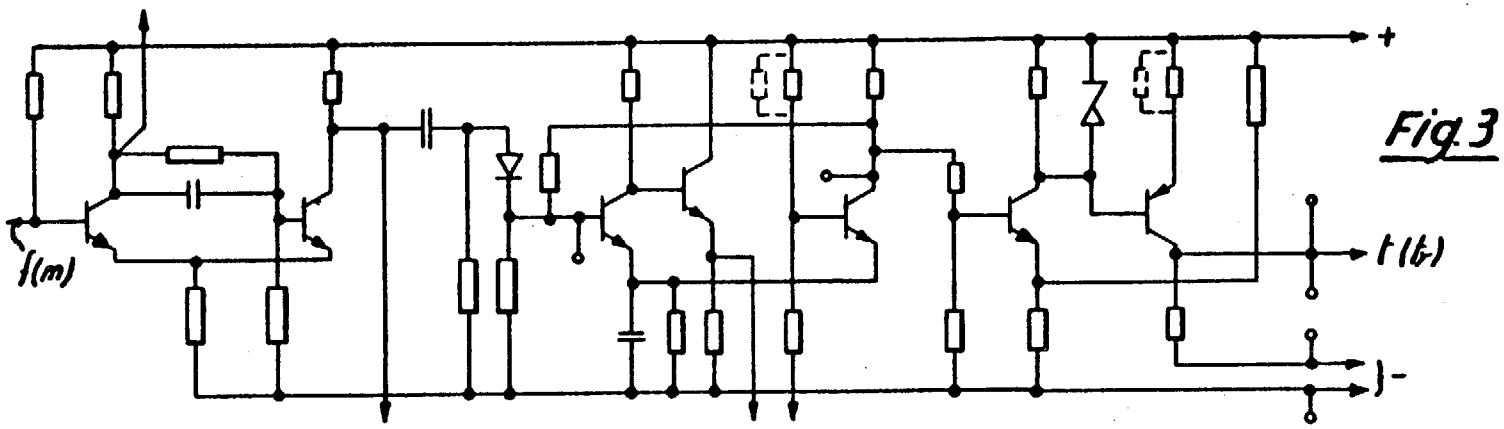
FIG. 3 is a schematic diagram representing a part of the diagram shown at FIG. 2.
Figure 5:
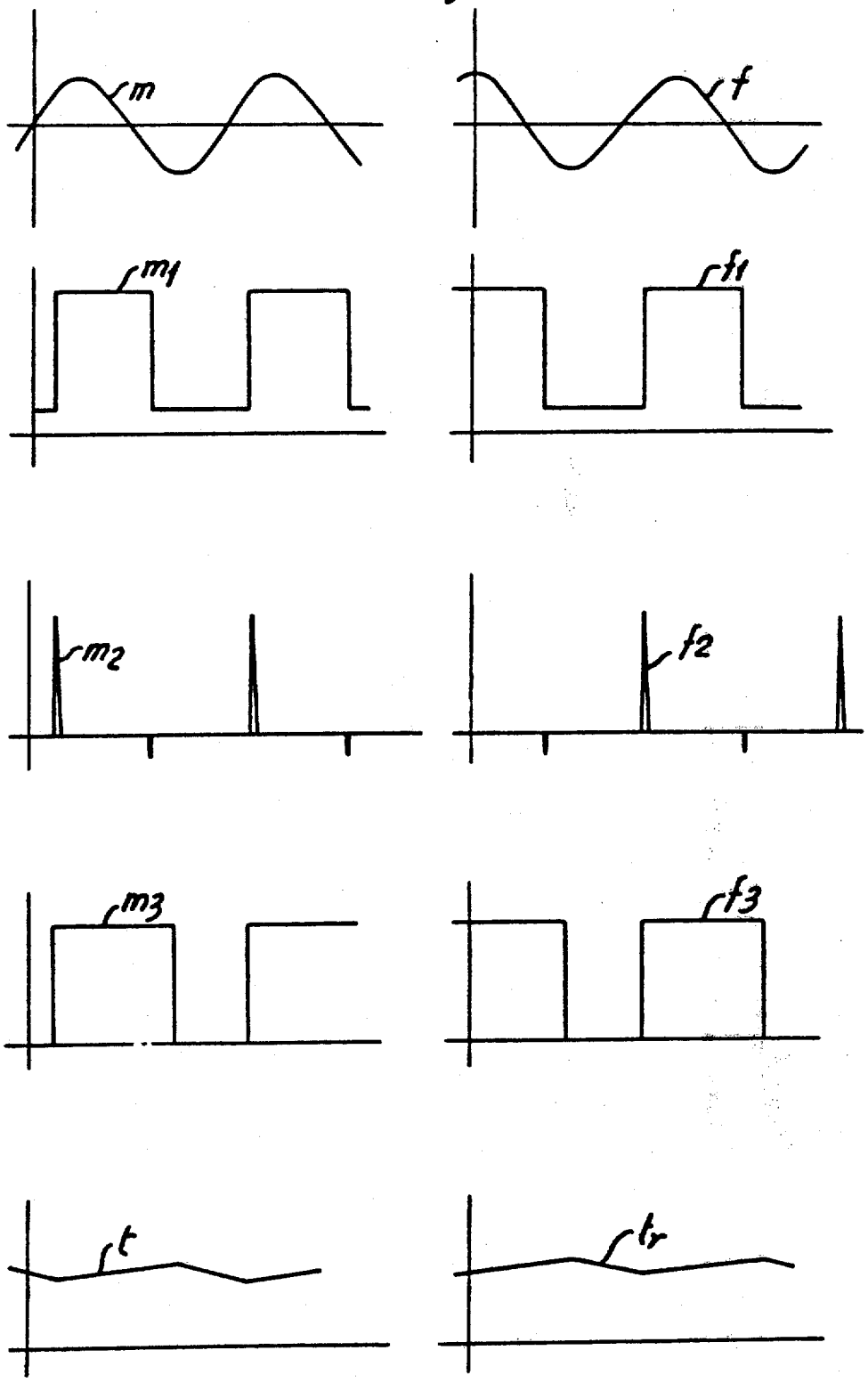
FIG. 5 shows wave shapes at different points of the circuit shown in FIG. 2.

FIG. 3 gives schematically, and by way of example, one embodiment of circuits 8, 9.

These circuits 8, 9 deliver continuous signals t, tr, which have average values corresponding to the frequency of the input signals mf, respectively. In this way if the frequency of the reference signal f changes during operation, the level of the reference velocity signal tr will vary causing an unbalance of the differential amplifier 5 and the delivering of a control signal C bringing the motor to its new desired working conditions.

The control principle of the motor M is always the same. That is, the velocity control provides control over a great range and the phase control provides high control precision.

In certain appliances it is important to know if the driving motor revolves or not at its reference speed. This is the case, for example, during the taking up of cinematographic pictures. In a variation shown schematically in FIG. 4, the control device described with reference to FIG. 3 is provided with an alarm device as well as a stopping device of the motor in case of breakdown.

The alarm device is constituted by a circuit 13 feeding a lamp 14. This circuit is fed by the signals $m_1$ and $f_1$ and delivers information only when one of the other of these signals ceases to exist, thereby causing the feeding of the lamp 14. In this way, if, for example, the reference source 1 is lost due to a breakdown, the operator is immediately warned visually.

The stopping device of the motor M also comprises a "AND" circuit 15 fed by the signals $m_1$ and $f_1$. This circuit delivers a maintaining signal to a relay 16. In this manner, the interrupter 17 connected in the control of the motor M is maintained when the two signals $m_1$ and $f_1$ are present in its "1" position for which it is controlled by the differential amplifier 5. In the absence of the one or the other of the signals $m_1$, $f_1$ the relay is dropped and the motor stops.

Such an alarm in the stopping devices may, of course, also be provided for the first embodiment described.

What is claimed and desired to be secured by letters patent is:

1. A control device comprising: circuit means delivering a DC reference velocity signal; reference frequency means delivering an AC reference frequency signal; generator means driven by a motor and delivering an AC generator signal corresponding to the actual speed and phase of the motor; phase responsive circuit means fed by said AC reference frequency signal and by the AC generator signal said phase responsive circuit means having a first position signal output and a second position signal output and being responsive to the phase difference between said AC reference frequency signal and said AC generator signal to produce corresponding DC voltage differences between said position signal outputs; circuit means including a rectifier and a filtering capacitor fed by the AC generator signal and delivering a DC velocity signal corresponding to the actual speed of the motor; differential amplifier means fed on the one hand by the sum of the DC reference velocity signal and the first position signal output, and on the other hand by the sum of the actual DC velocity signal and the second position signal output; said differential amplifier means delivering a DC control voltage the amplitude of which controls the energy supplied to the motor; and power amplifier means for said DC control voltage, a stabilizing circuit connected in parallel with said capacitor fed by the intermediary of a rectifier by the generator means.

2. Device according to claim 1 characterized by the fact that this stabilizing circuit is an electronic discharge circuit.

3. A control device comprising: circuit means delivering a DC reference velocity signal; reference frequency means delivering an AC reference frequency signal; generator means driven by a motor and delivering an AC generator signal corresponding to the actual speed and phase of the motor; phase responsive circuit means fed by said AC reference frequency signal and by the AC generator signal said phase responsive circuit means having a first position signal output and a second position signal output and being responsive to the phase difference between said AC reference frequency signal and said AC generator signal to produce corresponding DC voltage differences between said position signal outputs; circuit means including a rectifier and a filtering capacitor fed by the AC generator signal and delivering a DC velocity signal corresponding to the actual speed of the motor; differential amplifier means fed on the one hand by the sum of the DC reference velocity signal and the first position signal output, and on the other hand by the sum of the actual DC velocity signal and the second position signal output; said differential amplifier means delivering a DC control voltage the amplitude of which controls the energy supplied to the motor; and power amplifier means for said DC control voltage, and stabilizing circuit means in said circuit means comprising a transistor in parallel with said filtering capacitor, said transistor permitting the discharge of said capacitor when a heavy perturbation occurs in the control loop.

* * * * *